United States Patent [19]

Long

[11] 4,309,056

[45] Jan. 5, 1982

[54] AIR DEFLECTOR SUPPORT STRUCTURE

[76] Inventor: Alvin L. Long, Civilian Gen. Del., Beale A.F.B., Calif. 95903

[21] Appl. No.: 97,524

[22] Filed: Nov. 26, 1979

[51] Int. Cl.³ .............................................. B60J 1/20
[52] U.S. Cl. ........................................ 296/91; 98/2.12
[58] Field of Search ................... 296/15, 91; 248/476, 248/477, 208; 49/70; 98/2.12

[56] References Cited

U.S. PATENT DOCUMENTS

| | | | |
|---|---|---|---|
| 1,528,123 | 3/1925 | Miles | 296/91 |
| 2,493,685 | 1/1950 | Moler | 98/2.12 |
| 2,499,127 | 2/1950 | Beard | 98/2.12 |
| 3,139,303 | 6/1964 | Schutte | 296/208 X |
| 4,085,665 | 4/1978 | Paxton | 98/2.12 |
| 4,196,930 | 4/1980 | Busche | 296/91 |

FOREIGN PATENT DOCUMENTS 1379801 10/1964 France ................................ 296/91

*Primary Examiner*—David M. Mitchell
*Assistant Examiner*—Norman L. Stack, Jr.

[57] ABSTRACT

A air deflector support structure for a vehicle side door window opening is disclosed, said support structure consisting of a triangle shaped framework applied parallel to the exterior front extremity of the window opening, said support structure having a channel shaped air deflector hinged to the vertical rail of the support structure, a wing nut and bolt applied to a elongated slot in the horizontal rail of the support structure and through a hole in a projection on the lower part of the air deflector regulates the angle of air deflection into the open window of the vehicle door.

1 Claim, 1 Drawing Figure

AIR DEFLECTOR SUPPORT STRUCTURE

SUMMARY

The present invention relates to the problem of some passenger vehicles not having a air deflector in the front door window opening, many people would like to be able to control the air flow into their vehicles on a hot day but cannot do so without a air deflector. There are many air deflectors and supporting structures on the market today. However most air deflectors and their supporting structures stick out perpendicular from a vehicle side and in some cases interfere with existing side view mirrors.

The object of the present invention is to provide a air deflector and supporting structure that can be applied to the forward part of a passenger vehicle window opening in a manner that will not interfere with existing side view mirrors and at the same time be stylish for a passenger vehicle.

The present invention is a triangle shaped supporting structure for a air deflector, the triangle shape of the supporting structure is similar to the triangle shape of the forward part of a passenger vehicles window opening and lays parallel with the window opening and is secured to it by sheet metal screws, a air deflector is hinged to the verticle rail of the support structure and will regulate air currents into the vehicle when the window is open, the air deflector is adjustible and when not in use can be turned parallel to the support structure and will completely cover it.

DETAILED DESCRIPTION OF THE DRAWINGS

Figure 1:
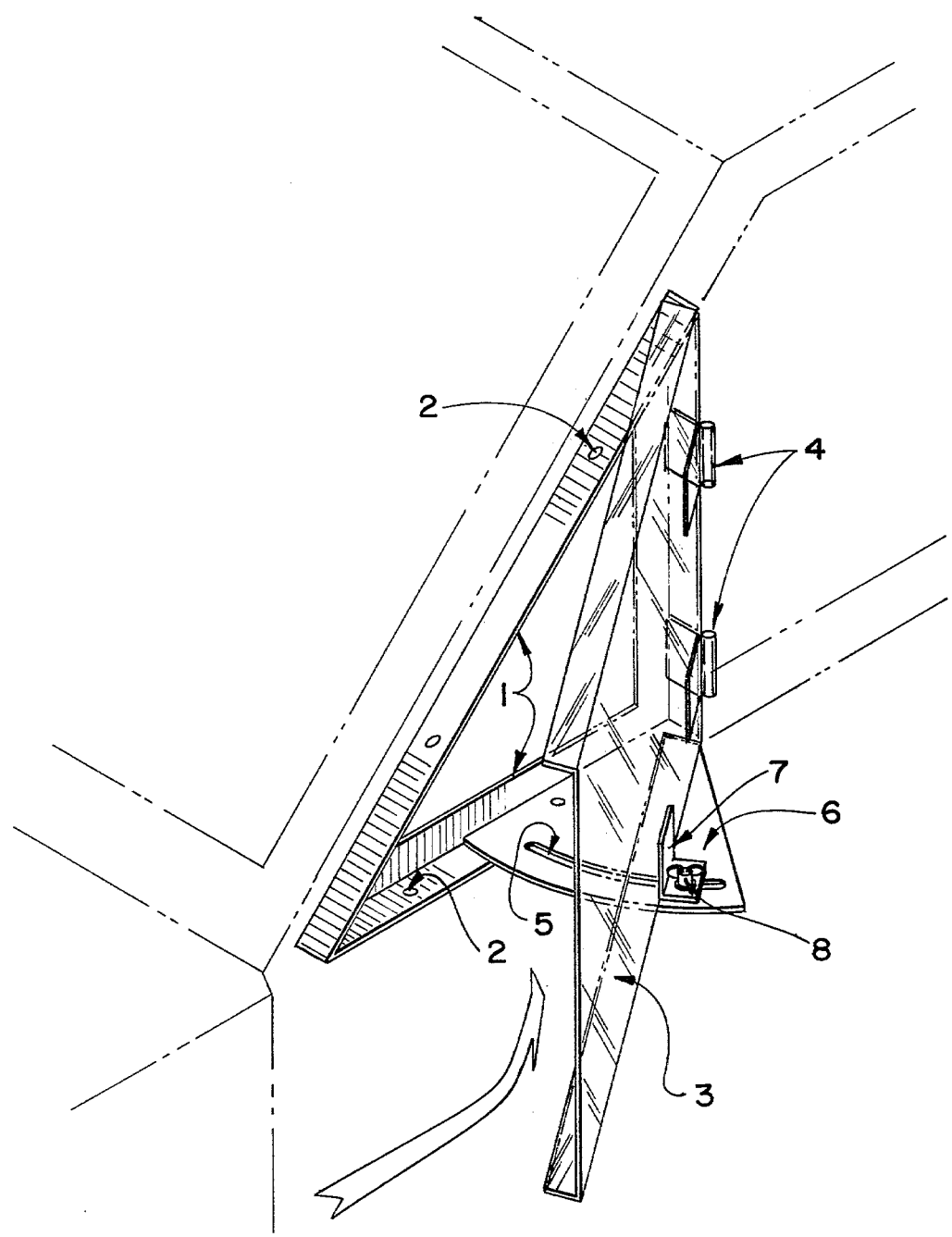
FIG. 1 is a air deflector support structure with a channel shaped air deflector hinged to its vertical rail, the triangle shaped air deflector support structure can be applied to vehicles that have a window opening that is formed by a front, top, and back rail, the front part of said window opening being triangle shaped will allow the triangle shaped air deflector support structure to be applied parallel to its exterior.

In the drawings FIG. 1 is a air deflector support structure 1 in the shape of a triangle, the rails of the triangle shaped support structure have holes 2 provided so that the support structure 1 may be secured to a window opening by the use of screws, the triangle shaped air deflector support structure 1 can be applied to vehicles that have a window opening that is formed by a front, top, and back rail, the front extremity of said window opening being triangle shaped will allow the triangle shaped air deflector support 1 to be applied parallel to its exterior, a channel shaped air deflector 3 is shown vertically hinged 4 to the vertical rail of the triangle shaped support structure, a elongated slot 5 is shown in a extension of the horizontal rail 6, said elongated slot 5 is in line with a extension 7 of the lower part of the channel shaped air deflector 3, a hole in the extension of the air deflector 7 is in line with the elongated slot 5, a wind nut and bolt 8 is shown securing the elongated slot 5 to the hole in the extension of the air deflector 7.

The air deflector 3 can be regulated as to the angle of air deflection into a vehicle by use of the wing nut and bolt 8.

The channel shape of the present air deflector 3 is considered a improvement over a flat air deflector in that for its size it will force more air into a vehicle than a flat air deflector of the same size.

The channel shaped air deflector 3 is shown as being transparent so that the air deflector support structure can be seen in detail.

What is claimed is:

1. A wind deflector and support structure for use with a vehicle side door having a single vertically moveable window, the improvements comprising:

A triangle shaped support structure including means for fixedly securing same to the front and bottom edge of the vehicle door window opening, the vertical rail of the support structure hinging and supporting a channel shaped air deflector for generating a flow of air into the vehicle in response to said vehicles forward movement, the horizontal rail of the support structure having a arm with a slot corresponding with a hole in a extension on the bottom edge of the air deflector, a bolt extending through the slot and hole having a wingnut to regulate the angle of the air deflection into the vehicle, the angle rail of the support structure attaches the top of the vertical rail with the front of the horizontal rail.

* * * * *